F. B. YINGLING.
MEASURING MACHINE.
APPLICATION FILED OCT. 28, 1914.
1,281,740.
Patented Oct. 15, 1918.
4 SHEETS—SHEET 3.
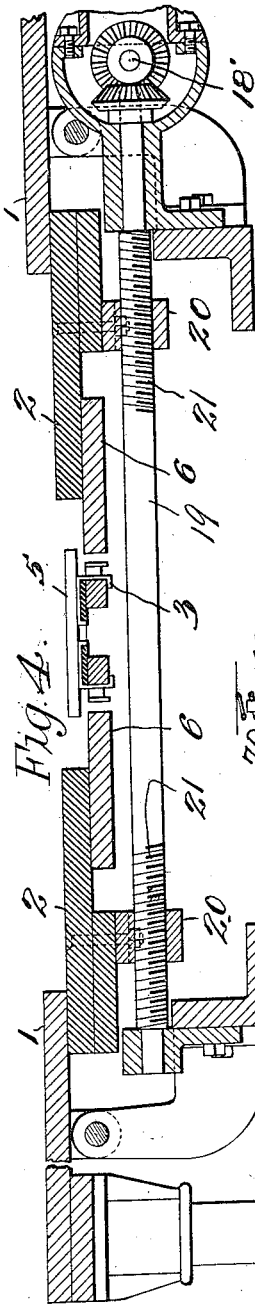
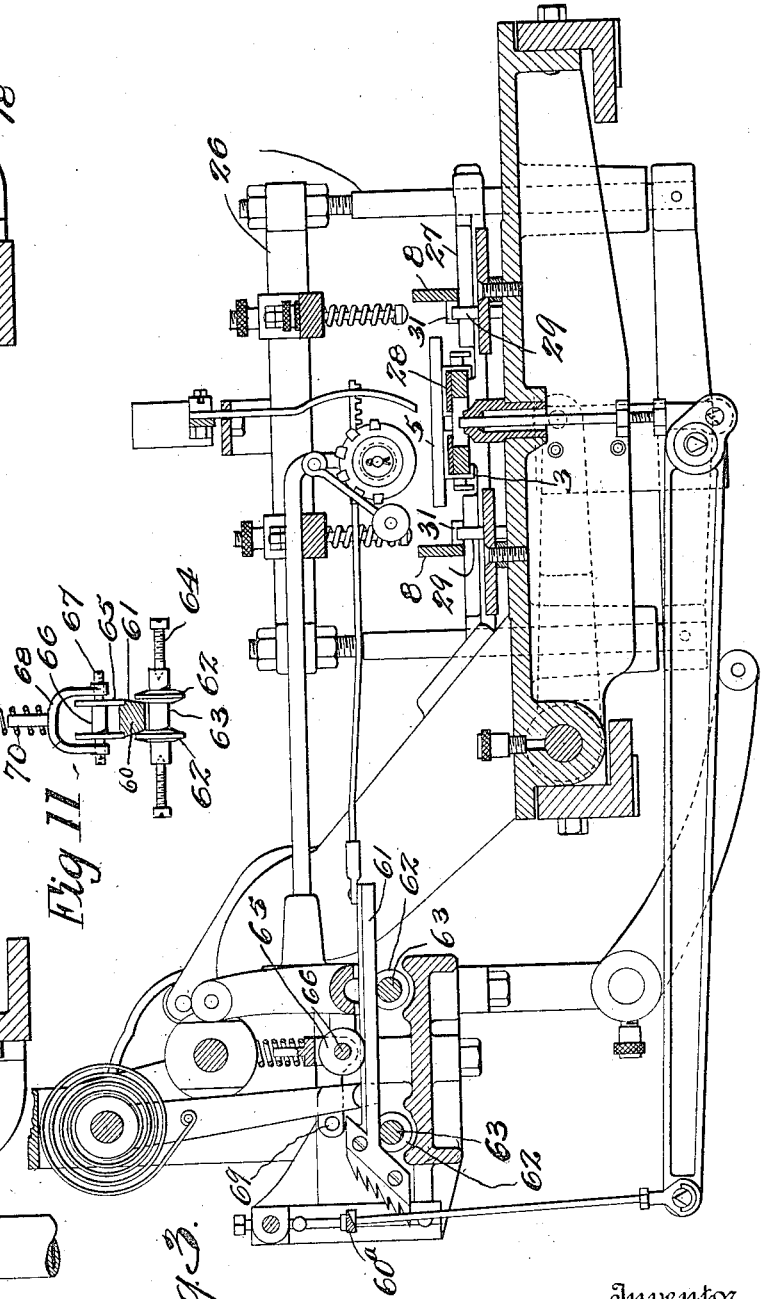
Witnesses
C. K. Davis
M. A. Wood
Inventor
F. B. Yingling
By
Buck, Parker & Smith
Attorneys

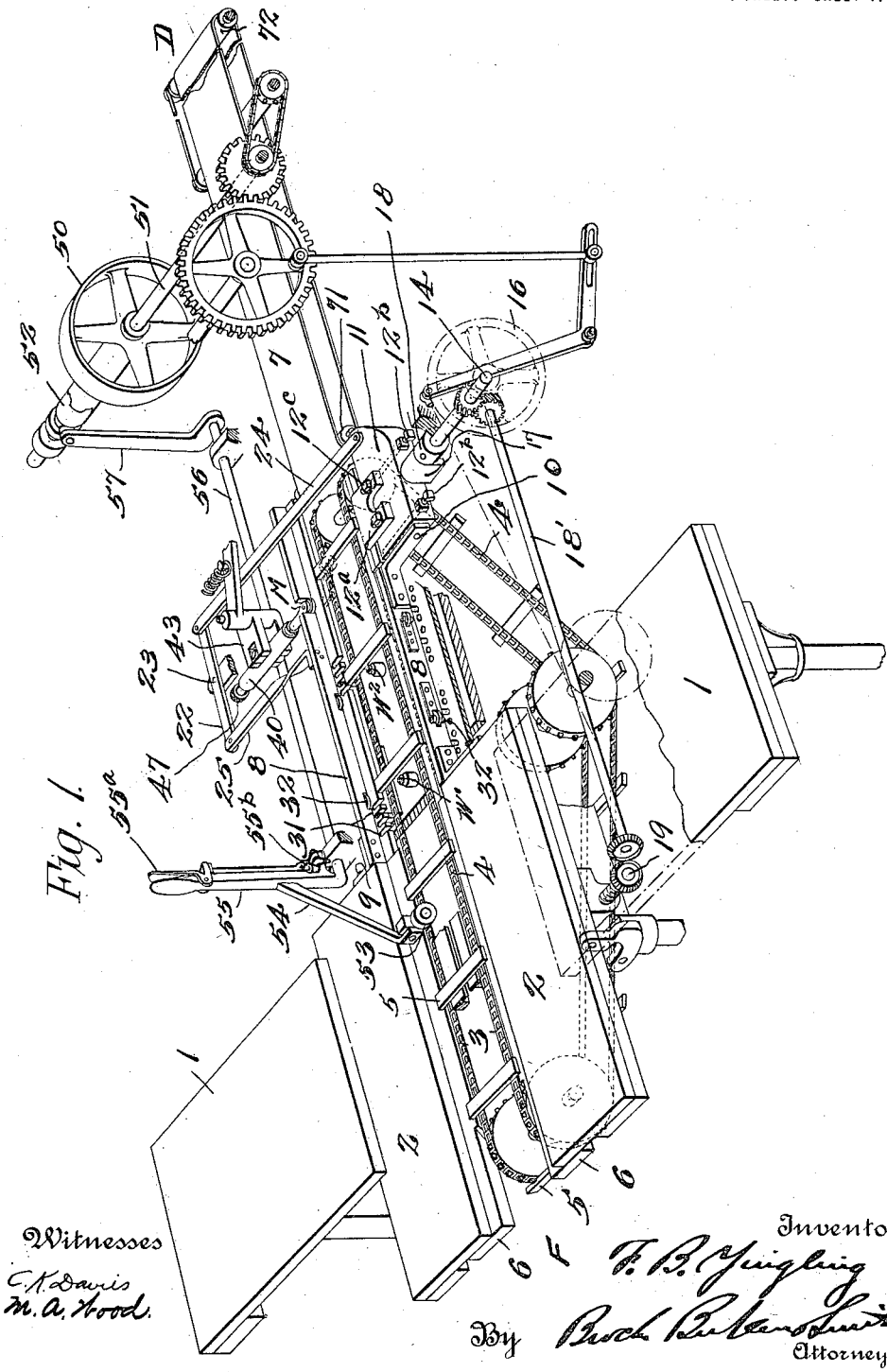

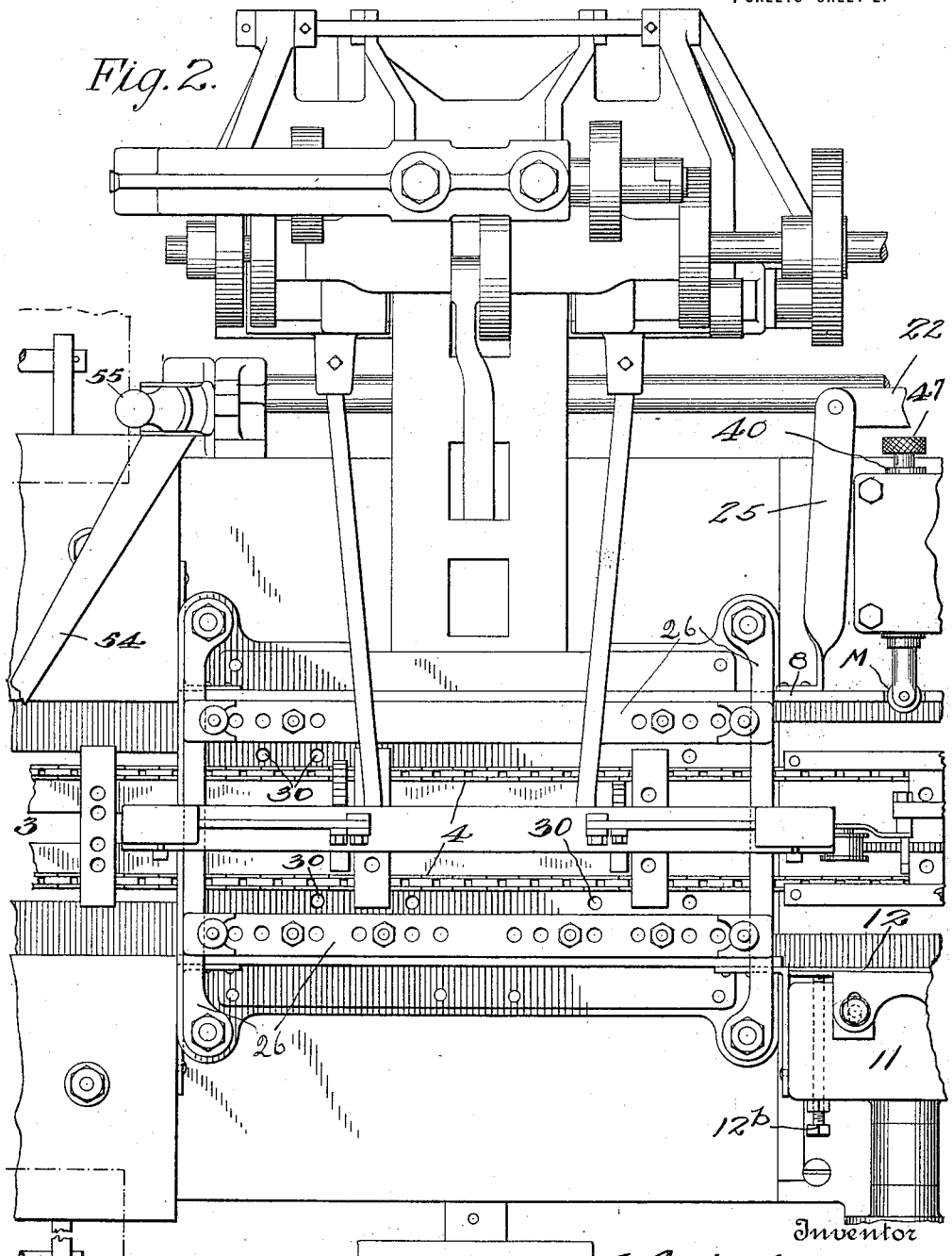

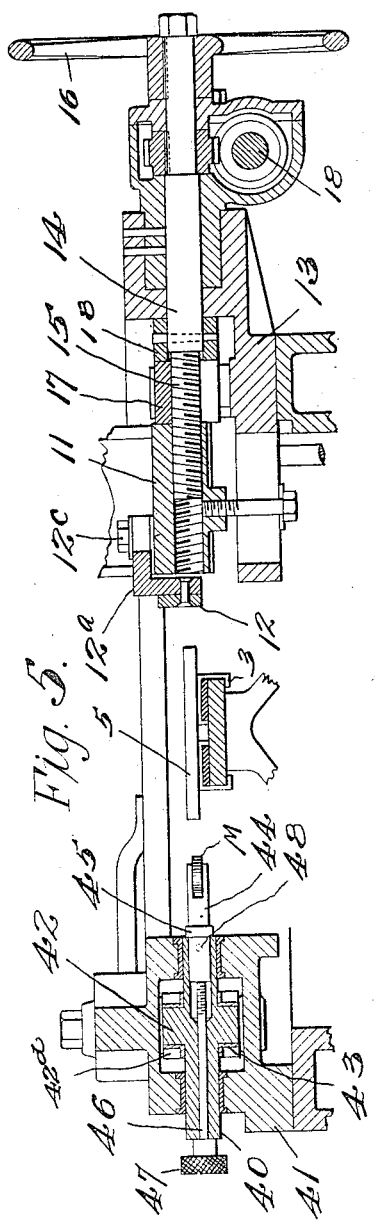
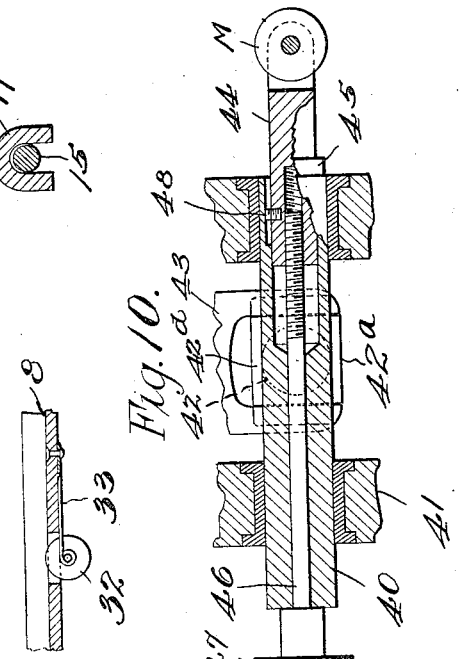
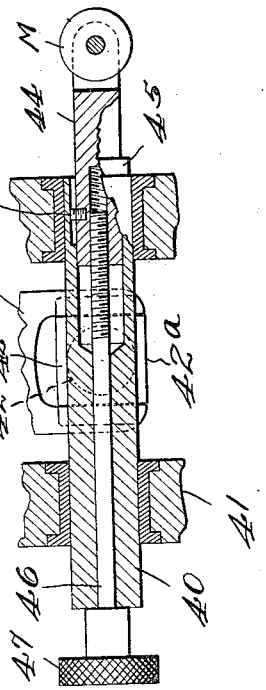
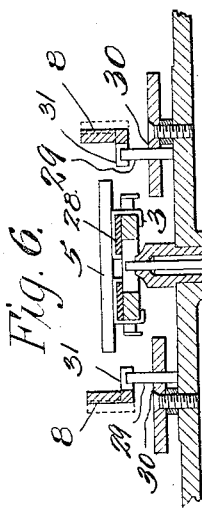
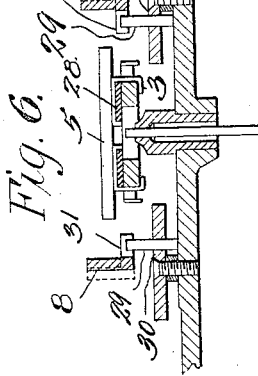
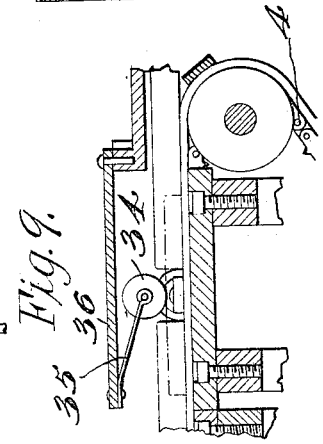

UNITED STATES PATENT OFFICE.

FRANK BEAM YINGLING, OF HAMILTON, OHIO, ASSIGNOR TO CERAMIC MACHINERY COMPANY, OF HAMILTON, OHIO, A CORPORATION OF OHIO.

MEASURING-MACHINE.

1,281,740.　　　　　Specification of Letters Patent.　　Patented Oct. 15, 1918.

Application filed October 28, 1914. Serial No. 869,128.

*To all whom it may concern:*

Be it known that I, FRANK B. YINGLING, a citizen of the United States, residing at Hamilton, State of Ohio, have invented certain new and useful Improvements in Measuring-Machines, of which the following is a specification.

My invention relates to improvements in measuring machines, especially adapted for measuring tiles and the like. The improvements relate, in the particular embodiment shown, to the class of machine disclosed in my previous application, Serial Number 726,301, filed October 17, 1912. Evidently, however, some of the features of my invention are not restricted to a machine of that particular type, but reference is made to the said application for an explanation of the general features of a machine in connection with which the herein disclosed improvements may be employed.

The improvements comprising the present invention relate largely to means for adjusting the machine to different sizes of tiles, to feeding and guiding means for the tiles, and to safety devices as will appear in a detailed description of the accompanying drawing, which illustrates one exemplifying embodiment of the invention. It will be clear to persons skilled in the art that the invention may be embodied in many different forms, and I do not limit myself to details except as claimed hereinafter.

Figure 1 is a perspective drawing of sufficient parts of a machine to enable the invention to be understood.

Fig. 2 is an enlarged plan view of the part of the machine relating to warp measuring, a similar part of the length measuring mechanism being shown at the right hand side of said figure.

Fig. 3 is a vertical section through one of the warp measuring devices.

Fig. 4 is a vertical section through the feed table.

Fig. 5 is a vertical section through the length measuring device.

Fig. 6 is a vertical sectional detail of a warp measuring device with tile guides.

Fig. 7 is a detail of one of the guide rails and guide rolls.

Fig. 8 is a detail of an interchangeable adjustment block for the length measuring device.

Fig. 9 is a detail of holding and retarding means associated with the length measuring device.

Fig. 10 is a detail of the movable length measuring element.

Fig. 11 is a detail in elevation at right angles to Fig. 3 of the selector bar and supporting means therefor shown in Fig. 3.

In Fig. 1, character F designates the feed or initial end of the machine and D the delivery end. Tiles are stacked on the fixed tables 1 at either side of the feed end. Underlying the inner ends of these tables are adjustable tables or feed supports 2, which may be adjusted toward or from the feed belt 3 comprising side chains 4 and slats 5, fully described in the above-mentioned application. Under the inner edges of the adjustable tables 2 are fixed supports or ledges 6 which underlie the ends of the slats 5. The adjustable tables 2 are to be adjusted for the length or transverse dimensions of the tiles and the tiles are placed upon the belt, one resting against each of the slats 5, and are held in proper line and position by the adjustable tables as they are fed successively to the first warp measuring device, of which the movable measuring point is designated as W' and a second movable measuring point as W², and then to the length measurer, of which the movable measurer is designated as M, and then to the carry-off belt 7. Angle shaped guide pieces 8 are connected with tables 2 to receive the tiles and guide them after they leave the tables and as they pass the respective measuring devices. These guides are pivoted to tables 2 at 9, and one of them is pivoted at 10 to a member 11 constituting an adjustable part of the length measurer, while the other is movably supported by connected devices, which will later be described.

The length measurer comprises the movable device or roller M above mentioned and an abutment 12 (Fig. 5) which is adjustable, but when adjusted for any particular length of tile remains stationary and may, therefore, be described as the fixed element or abutment. This abutment is carried by a movable block 11 suitably supported in relation to a part 13 of the frame. In this frame part is mounted shaft 14 of a screw 15, engaging block 11. The screw-shaft is conveniently rotated by hand wheel 16, and when rotated positions block 11 with its abutment 12 in relation to the center line of the machine. While it is not essential in all cases, to facilitate the position of the fixed measuring abutment, a set of interchangeable adjustment blocks 17 is preferably provided, these being open at the bottom so that they may be placed about the screw 15 in the position shown in Fig. 5. When the suitable block 17 is put in position, the movable block 11 is urged against it by rotating the hand-wheel 16 so that the adjustment block is firmly clamped between block 11 and a collar 18 on the screw shaft. This brings the fixed abutment 12 into a definite and accurate position in relation to the center line for the particular length of tile corresponding to the particular adjustment block employed.

It is desirable to effect simultaneous adjustment of the length measuring device, the tables 2 and the guides 8, since all these parts should be positioned in relation to the center line of the machine to fit the particular length of tile to be measured. Screw shaft 14 is, therefore, connected by suitable gearing with a longitudinal shaft 18', and this is geared to a transverse screw shaft 19 passing beneath the tables 2 and connected to nuts 20 on the table by means of oppositely threaded screws 21. Thus, when the hand-wheel 16 is rotated to adjust the length abutment, the tables are moved in relation to the center line to properly feed the tiles. The ends of guides 8 connected with the tables, are at the same time suitably positioned. The end of the guide 8 connected with block 11 is also properly positioned and the rearward end of the opposite guide 8 is positioned by a linkage connection with block 11, comprising a lever 22 fulcrumed at 23 to the frame part; a link 24 connecting one end of this lever with block 11 and a link 25 connecting the other end of the lever with adjacent guide 8. Thus, the tables, guides and length-measuring abutment are adjusted by substantially a single operation.

The pivotal connection of guides 8 with their supporting devices is desirable for the reason that, as explained in the above-mentioned application, a clamping frame 26 (Fig. 3) for the warp measuring devices is raised and lowered to clamp the tiles in warp measuring position, and a member 27 of this clamping frame runs beneath a movable belt guide 28 and raises and lowers this guide and the belt with the tile in relation to the fixed measuring pins 29. This transverse member 27 also underlies the guides 8 and correspondingly raises and lowers them so that they suitably guide the tiles in all positions. The fixed measuring pins 29, while fixed in relation to any particular size of tile, are mounted in different positions for different sizes of tiles, the holes 30 for some of these different positions being shown in Fig. 2; and the lower members of guides 8 are provided with slots 31, Fig. 1, to accommodate the measuring pins in whatever position they are placed.

When the machine is run at full speed, the smooth tiles have a tendency to continue to move when the belt stops in measuring position. That is, the tiles have a tendency to run ahead or leave contact with the slats 5. To obviate this, adjacent to the warp measuring devices, guiding and retarding rollers 32 (Figs. 1 and 7) are provided, carried by guides 8, and preferably spring pressed, to engage the tiles by springs 33, in the ends of which the rollers are journaled. These rollers engage the ends of the tiles when in their different measuring positions and effectively prevent overrunning. A similar tendency exists when the tiles are in length measuring position, and to prevent this, rollers 34, Fig. 9, are provided to bear upon the tops of the tiles when in length measuring position. These rollers are carried by springs 35 connected to a stationary frame member 36.

In originally adjusting the machine it is important that the abutment 12 should have proper relation to the movable block 11 which carries it, and for this purpose the abutment is mounted on a member $12^a$ engaged by screws $12^b$ passing through block 11. When the abutment is properly adjusted by screws $12^b$, it may be readily secured in position by cap screws $12^c$ passing through slots in member $12^a$ and engaging block 11.

The adjustment of the length measuring abutment by the means described is only sufficient to adjust the length measuring device at one side of the center line of the machine; that is, this effects one-half of the adjustment for length measuring. It is, therefore, desirable to provide different movable length-measuring devices to effect the adjustment at the other side of the machine. For this purpose, the movable measuring devices M carry a reciprocating plunger 40 mounted in frame part 41 (Fig. 5). This has trunnions 42 engaged by a block $42^1$, which is in turn engaged by fork 43 of the measuring lever fully described in the above-mentioned application. The measuring devices M preferably consist of hardened steel rollers rotatably mounted in removable heads 44. These heads have shoulders 45 bearing against the inner end of plunger 40 and removably secured by a screw 46 having a knurled head 47 at the outer end of the plunger. The length of the head 44 outward from shoulder 45 of course varies to correspond with the length of tile to be measured. The heads are provided with pins 48 engaging slots in the plunger so that the movable measuring device must necessarily be placed in proper position. The provision of a roller upon the movable measuring device insures the proper positioning of the tiles against the fixed abutment in measuring.

The machine is driven from a loose pulley 50 on a shaft 51 and the shaft is connected and disconnected by a clutch 52. To provide for automatically stopping the machine in case tiles are improperly placed on the carrier at the feed end, a roller 53 is provided, properly located above the tiles between tables 2. This roller is carried by an arm 54 of lever 55, and this lever is carried by a rock-shaft 56 connected by an arm 57 with movable clutch member 52. When the tiles are properly placed on the carrier they pass beneath the roller 53 without effect, but if the tile is improperly placed so that it is above its normal location, it raises roller 53 and throws out clutch 52 so that injury to the machine is avoided. The clutch may also be connected or disconnected by the hand lever when desired, and to hold the lever and clutch in any desired position a hand latch 55$^a$ and suitable connections to engage notches 55$^b$ in a stationary member may be provided.

Figs. 3 and 11 show important details of supporting and guiding means for the selector bar 60. The sides of this bar have faces 61 in V-shaped relation to each other and these fit similarly angled or tapered flanges 62 on rolls 63. The angular or tapered contacts between the bar and these lower rolls entirely take up lost motion and cause the bar to travel truly without lateral play. The rolls 62 have conical sockets engaged by the conical ends of bearing screws 64 and the adjustment of these screws, in an obvious way, takes up any play in the roll bearings. The bar is held in position upon the lower rolls by upper rolls 65, these being carried on a shaft 66. This shaft is supported by adjustable bearing screws 67 similar to screws 64, in a carrier or box 68 pivotally mounted at 69 in a stationary frame member. The spring 70 compressed between this carrier 68 and the frame member urges rolls 65 into engagement with the flat top of bar 60 and thus yieldingly but firmly holds the bar in engagement with its guide and permits its easy, practically frictionless travel to engage and disengage the selector dog 60$^a$ without any lateral or practical variation, and, therefore, without interfering with the accuracy of the measurement. My prior application above mentioned explains the mode of actuation of the selector bar in relation to the measuring devices and the printing means.

The carrier belt 3 with its slats 5, as clearly shown in Fig. 1, extends only to a point just past the length measuring means. At this point, the delivery belt 7 mounted on rolls 71, 72, and suitably driven from the main drive shaft 51, receives the tile and takes them away from the slatted carrier and places them in proper position for sorting according to the markings which have been placed upon them by the measuring devices. This continuously running delivery carrier separates tiles and prevents them from being damaged from jamming together, which might be the case if a suitable delivery carrier were not provided. The tile must be kept apart and not permitted to come in contact with each other as they are delivered from the machine. Without the delivery carrier it would be necessary to lengthen the slatted carrier, which works intermittently, and this increase of the mass and inertia of the intermittently moving carrier, including the larger number of tiles in engagement therewith, at each operation of the machine, would seriously interfere with the satisfactory action which is obtained by making the slatted carrier as short as possible.

I claim:—

1. In measuring machines for tiles and the like, the combination of a tile-carrying feed belt, means for driving the belt, tile supporting tables located one at each side of the feed end of the belt, the inner edges of said tables being arranged to confront the ends of the tiles and guide them, and means for adjusting the tables simultaneously toward and from the center line of the belt to properly guide tiles of different lengths.

2. In measuring machines for tiles and the like, the combination of a feed belt provided with tile engaging slats, fixed tile receiving tables, one at each side of the belt, adjustable tables between the receiving table and the belt, means for adjusting the adjustable tables toward and from the belt, stationary tile supports underlying said slats and the inner edges of said adjustable tables and means for supporting and propelling the belt.

3. In measuring machines for tiles and the like, the combination of a feed belt provided with tile-engaging slats, tile-supporting members lying below the ends of said slats, adjustable tables one at each side of the belt, the inner ends of the tables overlying said supporting members and being arranged opposite to the ends of the tiles carried by the belt, means for adjusting the tables simultaneously toward and from the belt to accommodate tiles of different lengths, and means for supporting and driving the belt.

4. In measuring machines for tiles and the like, the combination with a feed belt, means for supporting and driving the belt, length measuring means comprising a movable measuring element at one side of the belt, a block normally fixed but adjustably supported at the opposite side of the belt confronting the movable element, means for adjusting the block and a measuring abutment adjustably secured to the block, and means for actuating the movable measuring element in harmonious relation to the movement of the belt to measure the length of tiles carried by the belt.

5. In measuring machines for tiles and the like, the combination of a feed conveyer, means for driving the conveyer, adjustable feed and guide tables therefor adjacent to the feed end of the conveyer, a length measuring device arranged to be supplied by the conveyer and comprising an adjustable abutment block, means for simultaneously adjusting said block and tables in relation to the center line of the conveyer, and means for actuating the length measuring device in suitable relation to the movement of the conveyer.

6. In measuring machines for tiles and the like, the combination of a feed conveyer, adjustable feed and guide tables at the feed end of the conveyer, one at each side thereof, tile guides connected to said adjustable tables, a removable abutment block supporting the rear end of one of said guides, and means for simultaneously adjusting said tables, movable block and the rear end of the other of said guides in relation to the center line of the conveyer.

7. In measuring machines for tile and the like, the combination of a feed conveyer, an adjustable length-measuring abutment adjacent to one side of the conveyer, a movable carrier adjacent to the side of said conveyer opposite to said abutment, a length-measuring device readily attachable and detachable from said carrier, said last mentioned measuring device being proportioned in relation to one definite adjustment of said abutment, and means for operating said carrier in proper relation to the movement of the conveyer and in opposition to said abutment to measure the dimension of a tile placed between said device and said abutment.

8. In measuring machines for tiles and the like, the combination of a feed conveyer, an adjustable length measuring abutment located adjacent to one side of the conveyer, a movable length measuring device opposite the abutment and adjacent to the opposite side of the conveyer, and a readily changeable length measuring element removably mounted in said movable measuring device to coöperate with said abutment in a definite one of its different adjusted positions.

9. In measuring machines for tiles and the like, the combination of a feed conveyer, a movable abutment block located near one side of the conveyer, a screw engaging the block for its adjustment, a stationary bearing for the screw and interchangeable, and a readily-removable adjustment block to be inserted about the screw between said abutment block and a stationary part of the machine for conveniently regulating the adjusted position of the abutment block.

10. In measuring machines for tiles and the like, the combination of a feed conveyer, a movable length measuring element located adjacent to one side of the conveyer, a measuring abutment located near the other side of the conveyer and substantially opposite to said element, an adjustable support for said abutment, a screw for moving the abutment support toward and from the conveyer, an axially fixed shoulder about the screw and interchangeable, readily-removable adjustment blocks to be placed about the screw between said shoulder and said abutment support to conveniently regulate the adjusted position of the abutment.

11. In measuring machines for tile and the like, the combination of a feed conveyer, means for driving the conveyer, adjustable feed tables one at each side of the conveyer at the feed end, a clamping frame, means for moving said frame to clamp and release the tiles in suitable relation to the movement of the conveyer, tile guides extending rearwardly from said tables and movably connected therewith to accommodate the movement of the clamping frame, fixed measuring points adjacent to the clamping frame and to said guides, the guides being shaped to accommodate said points, a movable block serving as a length-measuring abutment and also movably supporting the rear end of one of said guides, means connecting said block with the opposite guide for moving the latter oppositely to the movement of the block, means for simultaneously adjusting said block and tables and thereby adjusting the guides, a movable measuring member adjacent to said frame to coöperate with said fixed points, and another movable measuring member opposite to said movable block to coöperate therewith in length measurement, and means for operating said measuring members in proper relation to the movement of the conveyer.

12. In measuring machines for tiles and the like, the combination of a feed conveyer, lateral tile guides at either side of the conveyer, driving means comprising a clutch, a movable device located above the conveyer adjacent to the feed end, and a connection from said device to the clutch whereby a tile improperly located upon the conveyer will actuate said device and stop the feed.

13. In tile measuring mechanism, a movable measuring element comprising a selector bar connected with the printing device, the selector bar having convergent faces, complementally shaped rollers engaging said faces, and another roller engaging above the selector bar with spring pressure to hold the selector bar steadily in its reciprocating movement.

FRANK BEAM YINGLING.

Witnesses:
HARRY J. KREBLER, Jr.,
W. W. VINNEDGE.

Copies of this patent may be obtained for five cents each, by addressing the "Commissioner of Patents, Washington, D. C."